US012056288B1

(12) United States Patent
Lee (10) Patent No.: US 12,056,288 B1
(45) Date of Patent: Aug. 6, 2024

(54) COMPUTER KEYBOARD PROVIDED WITH THUMB-OPERATED OPTICAL MOUSE

(71) Applicant: Jaekyu Lee, Namyangju-si (KR)

(72) Inventor: Jaekyu Lee, Namyangju-si (KR)

( * ) Notice: Subject to any disclaimer, the term of this patent is extended or adjusted under 35 U.S.C. 154(b) by 0 days.

(21) Appl. No.: 18/562,383

(22) PCT Filed: Jun. 15, 2022

(86) PCT No.: PCT/KR2022/008451
§ 371 (c)(1),
(2) Date: Nov. 20, 2023

(87) PCT Pub. No.: WO2022/265383
PCT Pub. Date: Dec. 22, 2022

(30) Foreign Application Priority Data

Jun. 17, 2021 (KR) .......................... 10-2021-0079022

(51) Int. Cl.
*G06F 3/02* (2006.01)
*G06F 3/03* (2006.01)
*G06F 3/0354* (2013.01)

(52) U.S. Cl.
CPC .......... *G06F 3/0213* (2013.01); *G06F 3/0308* (2013.01); *G06F 3/03543* (2013.01)

(58) Field of Classification Search
CPC ... G06F 3/0213; G06F 3/0308; G06F 3/03543
See application file for complete search history.

(56) References Cited

U.S. PATENT DOCUMENTS

| 5,704,037 | A | * | 12/1997 | Chen ..................... | G06F 3/0213 345/157 |
| 5,821,921 | A | * | 10/1998 | Osborn ................. | G06F 3/0362 345/184 |
| 6,061,004 | A | * | 5/2000 | Rosenberg ............. | G06F 3/016 341/20 |
| 6,107,991 | A | * | 8/2000 | Osborn ................. | G06F 3/0354 345/184 |
| 6,215,478 | B1 | * | 4/2001 | Yeh ........................ | G06F 3/038 345/173 |

(Continued)

FOREIGN PATENT DOCUMENTS

KR  20-1998-0058999 A  10/1998
KR  10-2008-0006493 A   1/2008

(Continued)

OTHER PUBLICATIONS

International Search Report for PCT/KR2022/008451 mailed Sep. 19, 2022 from Korean Intellectual Property Office.

*Primary Examiner* — Jonathan A Boyd
(74) *Attorney, Agent, or Firm* — Revolution IP, PLLC (57) ABSTRACT

The present invention relates to a computer keyboard provided with an optical mouse (light mouse) used with a thumb, for improving the inconvenience of moving between a keyboard and a mouse when using a computer, wherein while both hands remain positioned on the computer keyboard, the thumb of one hand may move a mouse pointer and the thumb of the other hand may perform a clicking operation, and the clicking operation can also be performed using the index finger, the middle finger, and the ring finger of the hand that moves the mouse pointer.

8 Claims, 6 Drawing Sheets

(56) References Cited

U.S. PATENT DOCUMENTS

| | | | | |
|---|---|---|---|---|
| 7,253,803 | B2* | 8/2007 | Schena | G06F 3/016 |
| | | | | 345/173 |
| 8,786,544 | B1* | 7/2014 | Osborn | G06F 3/03548 |
| | | | | 341/20 |
| 2005/0243074 | A1* | 11/2005 | Osborn | G06F 3/03548 |
| | | | | 345/184 |

FOREIGN PATENT DOCUMENTS

| | | |
|---|---|---|
| KR | 10-2011-0062740 A | 6/2011 |
| KR | 10-2011-0128108 A | 11/2011 |
| KR | 10-1544540 B1 | 8/2015 |
| KR | 10-2187964 B1 | 12/2020 |

* cited by examiner

COMPUTER KEYBOARD PROVIDED WITH THUMB-OPERATED OPTICAL MOUSE

TECHNICAL FIELD

The present invention relates to a keyboard and an optical mouse device, which are basic input devices of a computer, and more particularly, to a keyboard that is equipped with a thumb-operated optical mouse within the keyboard and does not require a separate mouse.

BACKGROUND ART

A transition of computers to a graphical user interface (GUI) system began after a mouse was introduced as a device that may move a pointer on a monitor. Since then, touchpad, joystick, and pointing stick type pointing devices integrated into a computer keyboard have been developed and used to replace the mouse connected to the outside of the computer.

A difference in use between the touchpad, joystick, and pointing stick type pointing devices and a mouse is that the mouse moves to set pointer positions, but these pointing devices have positions fixed within a keyboard and move fingers to set the pointer positions. However, in actual use experience, when setting the pointer positions with the touchpad, joystick, or pointing stick type pointing devices, pointer positioning is not as precise and quick as a typical mouse.

For this reason, the touchpad, joystick, and pointing stick type pointing devices are less convenient to use than the mouse, so even if computer keyboards, laptops, and the like are equipped with the touchpad, joystick, and pointing stick type pointing devices, most people is using a separate mouse by connecting the mouse thereto.

However, when performing a computer operation, there is a problem in that performing the operation while repeatedly moving hands to the keyboard and the mouse reduces operation concentration and operation efficiency.

PRIOR ART DOCUMENT (Patent Document)
Korean Patent Application No. 10-2009-0119557 Mouse on the Keyboard Controlled by Thumb Finger
Korean Utility Model Application No. 20-1997-0003480 Natural Computer Keyboard with Thumb Touchpad Mouse

DISCLOSURE

Technical Problem

The present invention provides a computer keyboard equipped with an optical mouse using a thumb, in which, when using a computer, the optical mouse is separated from a computer keyboard and used as separate device, so hands move back and forth between the keyboard and the optical mouse to improve the inconvenience of reduced operation concentration and operation efficiency.

Technical Solution

In an aspect of the present invention, a computer keyboard provided with a thumb-operated optical mouse includes: the conventional computer keyboard; an optical mouse pointing device including an optical mouse pointing module that is operated with a thumb of one hand and is in charge of moving a mouse pointer, and an optical mouse pad base that guides the optical mouse pointing module in horizontal and vertical directions and functions as an optical mouse pad, and an optical mouse click button.

Like a typical optical mouse pointing device, the optical mouse pointing module may include an LED lamp, an optical lens, and a light receiving unit formed in an optical mouse pointing body, and as a position of the optical mouse pointing module moves by the thumb, a position of the optical mouse pointer may be controlled.

In addition, the optical mouse pointing module may further include a momentary push button, and the optical mouse pointer may move on a monitor according to a positional displacement of the optical mouse pointing module only when the momentary push button is pressed, when the momentary push button is not pressed, the position of the pointer may be controlled not to move on the monitor even if there is a positional displacement of the optical mouse pointing module, when the optical mouse pointing module moves while pressing the momentary push button with the thumb to move the optical mouse pointer, the optical mouse pointing module may move in an opposite direction to previous movement or toward a center of the optical mouse pad base while not pressing the momentary push button, and then the optical mouse pointing module moves while pressing the momentary push button with the thumb, the mouse pointer may be controlled to further move from an immediately previous position, and even if the optical mouse pointing module moves within a limited size of the pad base of the optical mouse pointing device, the position of the mouse pointer may be easily controlled with a mouse resolution set by a user.

In addition, the momentary push button of the optical mouse pointing module may be configured in two or more stages, and when the mouse resolution is set differently for each stage and press and move a designated stage of the momentary push button with the thumb, by moving the mouse pointer to the mouse resolution of the corresponding stage, even if the optical mouse pointing module moves within the limited size of the pad base of the optical mouse pointing device, the position of the mouse pointer may be easily controlled.

In addition, the optical mouse pointing device may include a one side optical mouse pointing device composed of a plurality of guide members coupled at both ends to a body of the optical mouse pointing module to guide the movement of the optical mouse pointing module in one direction, a one side optical mouse base having the guide member coupled thereto and having a central portion of a bottom perforated long in one direction so that light generated from an LED lamp of the optical mouse pointing module and transmitted to an optical lens passes through, and a the optical mouse pointing module; a plurality of guide members coupled to both ends of the one side optical mouse base of one side optical mouse pointing device in order to guide the one side optical mouse pointing device in a direction perpendicular to a movement direction of one side of the optical mouse pointing module of the one side optical mouse pointing device; and an optical mouse pad base coupled to the guide member and having an upper surface of a bottom serving as an optical mouse pad.

In addition, in the one side optical mouse base, when the thumb that operates the optical mouse pointing module is separated from the optical mouse pointing module, an elastic member for returning the optical mouse pointing module to the center of the one side optical mouse base may be disposed at an end of the guide member, one side of the elastic member may be coupled to the one side optical mouse base, and the other side of the elastic member may be coupled to an elastic member end cap, a slot hole may be formed in a guide direction on one side of the guide member cover surrounding the guide member to prevent interference with the movement of the elastic member end cap, a step may be formed inside the central portion so that the elastic member end cap to which the elastic member is coupled is in contact with and stops at the step, so the optical mouse pointing module that moves in contact with one or more elastic member end caps is fixed at the center of the one side optical mouse base.

In addition, in the optical mouse pointing device, when the thumb that operates the optical mouse pointing module is separated from the optical mouse pointing module, an elastic member for returning the one side optical mouse base to the center of the optical mouse pointing device may be disposed at an end of the guide member, one side of the elastic member may be coupled to the optical mouse pad base, and the other side of the elastic member may be coupled to an elastic member end cap, a slot hole may be formed in a guide direction on one side of the guide member cover surrounding the guide member to prevent interference with the movement of the elastic member end cap, a step may be formed inside the central portion so that the elastic member end cap to which the elastic member is coupled is in contact with and stops at the step, so the one side optical mouse base that moves in contact with one or more elastic member end caps is fixed at the center of the optical mouse pad base.

In addition, in the optical mouse pointing device, a thumb of one hand may be placed on one side below a space bar of the keyboard to easily operate the optical mouse pointing module with the thumb of the same hand while maintaining a reference position of the keyboard; a thumb of a hand other than a hand that operates the optical mouse pointing module with the optical mouse click button may be placed on an opposite side of the optical mouse pointing device below the space bar of the keyboard while maintaining the reference position of the keyboard, so that left-click button, right-click button, and wheel button of the mouse is operated with the thumb of the hand other than the hand that operates the optical mouse pointing module; and by separately performing the pointer movement of the optical mouse and the clicking operation of the button with the thumbs of both hands and maintaining the thumbs of both hands at each reference position on the keyboard, when using the computer to input character keys and perform a mouse operation, the movement of both hands may be minimized, maximizing operation efficiency and maintaining user's concentration.

In addition, the optical mouse pointing device is disposed on one side below the space bar of the keyboard to facilitate the operation of the optical mouse pointing module with the thumb of the same hand while maintaining the index finger of one hand at the reference position of the keyboard; and is provided with the optical mouse click button to operate the left click button, right click button, and wheel button of the mouse with the same hand that operates the optical mouse pointing module, and click the left-click button, wheel button, and right-click button of the mouse by pressing each character key with the index finger, middle finger, and ring finger of the same hand while pressing and holding the momentary push button with the thumb to notify the computer that the mouse pointer is in the movement mode, and perform up and down scrolling functions of the wheel button by arranging dedicated control keys separated from the character key above and below the character key handled, in particular, by the middle finger, respectively; thereby performing all functions of the optical mouse with only one hand.

In addition, in the optical mouse pointing device, a protective cover made of a flexible material may cover between a border area adjacent to the keyboard into which the device is inserted and a perimeter of the body of the optical mouse pointing module to prevent foreign substances such as beverages and dust from penetrating and interference with the movement of the optical mouse pointing module.

Advantageous Effects

By using a computer keyboard provided with an optical mouse in which a thumb of one hand may move a mouse pointer and a thumb of the other hand may perform a clicking operation while both hands remain positioned on the computer keyboard, and clicking operations of a left-click button, a wheel button, and a right-click button of the mouse, respectively, may also be performed using a thumb, a middle finger, and a ring finger of the hand that moves the mouse pointer, it is possible to improve concentration and efficiency of computer operation.

DESCRIPTION OF REFERENCE NUMERALS

100: Keyboard
101: Letter F
102: Letter J key
103: Letter K key
104: Scroll up key
105: Scroll down key
106: Character L key
121: Optical mouse left-click button
122: Optical mouse wheel button
123: Optical mouse right-click button
200: Optical mouse pointing device
201: Optical mouse pad base
202*a*: Vertical guide cylinder
202*b*: Horizontal guide cylinder
203*a*: Vertical tension spring
203*b*: Horizontal tension spring
204: Tension spring end cap
205*a*: Vertical guide cylinder cover
205*b*: Horizontal guide cylinder cover
210: Horizontal optical mouse pointing device
211: Horizontal optical mouse base
220: Optical mouse pointing module 221: Optical mouse pointing body
222: LED lamp
223: Optical lens
224: Light receiving unit
225: Momentary push button
300: Optical mouse pointing device
301: Optical mouse pad base
302a: Vertical guide cylinder
302b: Horizontal guide cylinder
303a: Vertical compression spring
303b: Horizontal compression spring
304: Compression spring end cap
305a: Vertical guide cylinder cover
305b: Horizontal guide cylinder cover
310: Horizontal optical mouse pointing device
311: Horizontal optical mouse base

BEST MODE

Hereinafter, preferred embodiments of the present invention will be described in detail with reference to the accompanying drawings.

Figure 1:
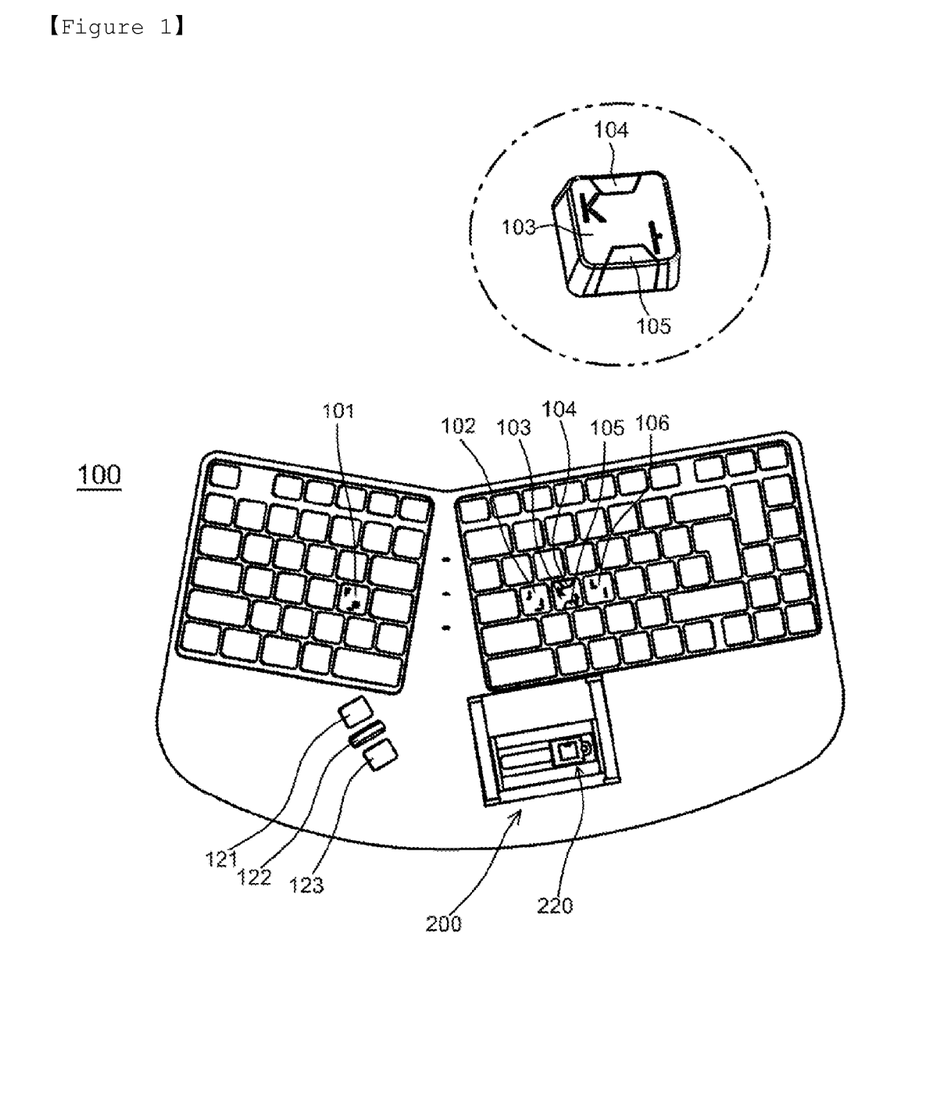
FIG. 1 is a configuration diagram of a "computer keyboard provided with a thumb-operated optical mouse" according to an embodiment of the present invention.

FIG. 1 is an overall appearance of an embodiment in which a "computer keyboard provided with a thumb-operated optical mouse" is applied.

The present invention can be applied to both left and right separation type keyboard and an integrated keyboard. FIG. 1 illustrates an integrated keyboard, in which the keyboard is separated into left and right sides. An optical mouse pointing device 200 is disposed at a bottom of a right space bar of a keyboard 100, and a thumb of a right hand is in charge of operating an optical mouse pointing module 220. An optical mouse left-click button 121, an optical mouse wheel button 122, and an optical mouse right-click button 123 are disposed at a bottom of a left space bar of the keyboard 100, and a thumb of a left hand is in charge of operation. Even when performing a mouse operation or inputting character keys, since the thumb of the left hand is always placed on a letter F key 101 and the thumb of the right hand is placed on a letter J key 102, there is a need to move hands in order to perform the mouse operation and input the character keys, resulting in greatly improving convenience.

In addition, in order to perform all functions of the optical mouse with only the right hand, the thumb of the right hand presses the letter J key 102, the middle finger of the right hand presses the letter K key 103, and the ring finger of the right hand presses a letter L key 106 while pressing and holding a momentary push button 225 of the optical mouse pointing module 220 with the right thumb to notify a computer that a mouse pointer is in a movement mode, so a clicking operation of the left-click button, wheel button, and right-click button of the mouse is performed. In particular, a scroll up key 104 is disposed above the letter K key 103 and a scroll down key 105 is disposed below the letter K key 103, respectively, so the scroll up key 104 and the scroll down key 105 are in charge of up and down scrolling functions of the wheel button. In other words, it becomes very convenient as all the functions of the optical mouse can be performed with only the right hand.

Figure 2:
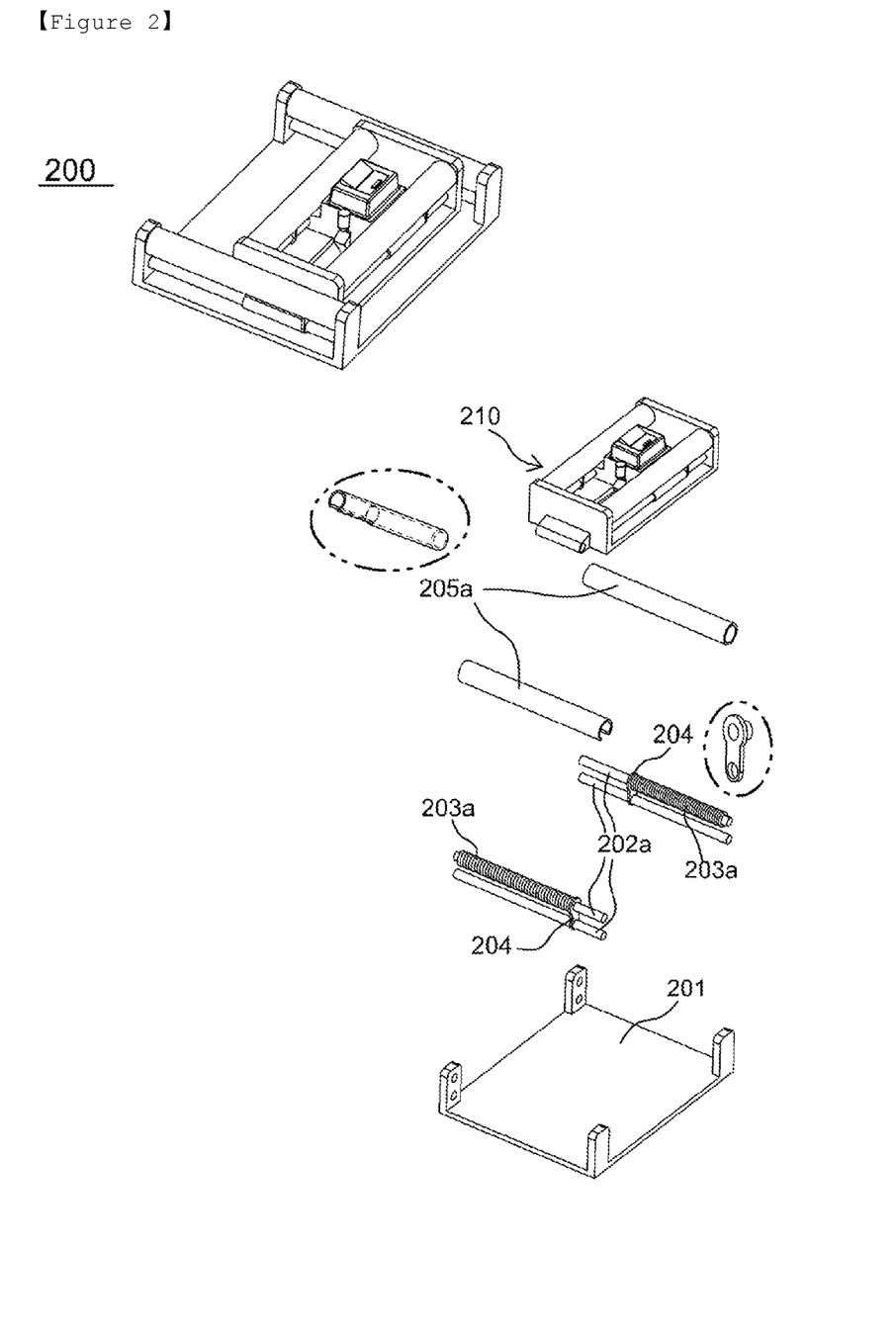
FIG. 2 is a configuration diagram of an "optical mouse pointing device" illustrated in FIG. 1.

FIG. 2 is a configuration diagram of the "optical mouse pointing device" illustrated in FIG. 1.

Two vertical guide cylinders 202a on the left and right, respectively, are coupled to two groove parts disposed at top and bottom at both ends of an optical mouse pad base 201 in a vertical direction whose bottom surface functions as an optical mouse pad. One vertical tension spring 203a is assembled to an upper end of the vertical guide cylinder 202a on an upper left side, the upper side of the vertical tension spring 203a is coupled to a perimeter of the groove part at the front side of the upper left of the optical mouse pad base 201 on which the vertical guide cylinder 202a is assembled, and a lower side of the vertical tension spring 203a is coupled to a tension spring end cap 204. One vertical tension spring 203a is assembled to an upper end of the vertical guide cylinder 202a on an upper left side, the upper side of the vertical tension spring 203a is coupled to a perimeter of the groove part at the front side of the upper left of the optical mouse pad base 201 on which the vertical guide cylinder 202a is assembled, and a lower side of the vertical tension spring 203a is coupled to the tension spring end cap 204. The tension spring end cap 204 moves along two vertical guide cylinders 202a disposed up and down while upper portions of each tension spring end cap 204 are coupled to one end of the vertical tension spring 203a and the lower portions are in contact with vertical guide cylinders 202a vertically coupled at both ends of the optical mouse pad base 201.

As illustrated in FIG. 2, when the horizontal optical mouse pointing device 210 is disposed eccentrically below the optical mouse pad base 201, a left tension spring end cap 204 contacting a left lower surface of a member on which vertical holes for being assembled with the vertical guide cylinder 202a at both ends of the horizontal optical mouse pointing device 210 in a horizontal direction is disposed at the lower portion of the left vertical guide cylinder 202a and the length of the coupled left vertical tension spring 203a extends, and the right tension spring end cap 204 is in contact with the end disposed inside a vertical guide cylinder cover 205a and is not in contact with a front surface of the member on which the vertical holes for being assembled with the right vertical guide cylinder 202a of the horizontal optical mouse pointing device 210 are formed.

In FIG. 2, when a thumb operating the optical mouse pointing module 220 is separated from the optical mouse pointing module 220, a restoring force of the left vertical tension spring 203a acts to cause the left tension spring end cap 204 coupled to the left vertical tension spring 203a to apply force to a surface of the member on which the vertical holes for being assembled with the vertical guide cylinder 202a at the lower left of the horizontal optical mouse pointing device 210 are formed to move the horizontal optical mouse pointing device 210 upward, and then the left tension spring end cap 204 is in contact with and stops at an end formed inside the left vertical guide cylinder cover 205a to return the horizontal optical mouse pointing device 210 to a center of the optical mouse pointing device 200.

FIG. 2 illustrates the appearance in which the horizontal optical mouse pointing device 210 moves downward, and the returning structure as described above is described. Even when the horizontal optical mouse pointing device 210 moves upward, the returning structure is the same, with only the vertical tension spring 203a acting as an elastic restoring force being different.

In the vertical guide cylinder cover 205a, the end is formed inside the corresponding position so that the tension spring end cap 204 and the horizontal optical mouse pointing device 210 may stop when the horizontal optical mouse pointing device 210, which returns in contact with the tension spring end cap 204, returns to the center of the optical mouse pointing device 200, and a slot hole is formed so that the tension spring end cap 204 does not interfere when moving in one direction in which the tension force of the vertical tension spring 203a acts, so one pad on the left and one pad on the right are coupled around the upper groove parts at both ends of the optical mouse pad base 201 in a vertical direction, as illustrated in FIG. 2.

Figure 3:
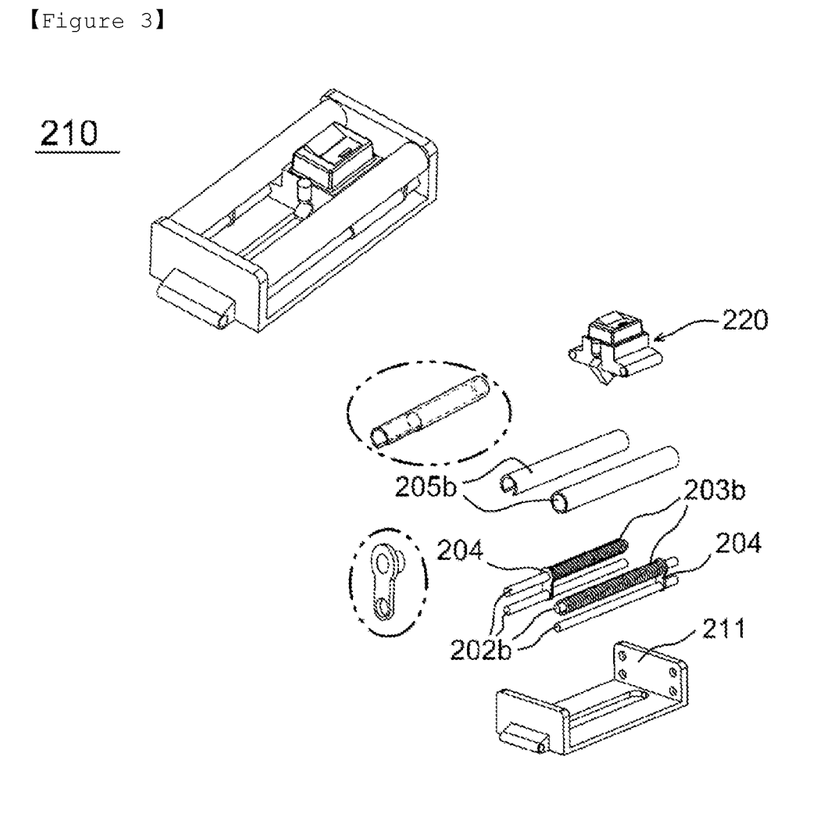
FIG. 3 is a configuration diagram of a "horizontal optical mouse pointing device" illustrated in FIG. 2.

FIG. 3 is a configuration diagram of the "horizontal optical mouse pointing device" illustrated in FIG. 2.

In the horizontal optical mouse base 211, a central portion of the bottom is perforated long in the horizontal direction so that light generated from the LED lamp 222 of the optical mouse pointing module 220 and transmitted to the optical lens 223 may pass through, the vertical holes are formed in members at both ends of the horizontal optical mouse base 211 in the horizontal direction so that it may move in the vertical direction along the vertical guide cylinder 202a, and two groove parts are disposed at the top and bottom inside both ends of the horizontal optical mouse base 211 in the horizontal direction. Two horizontal guide cylinders 202b are coupled to the upper and lower groove parts of the horizontal optical mouse base 211, respectively.

One horizontal tension spring 203b is assembled on the right end of the horizontal guide cylinder 202b in the upper portion of the horizontal optical mouse base 211, so the right side of the horizontal tension spring 203b is coupled to the perimeter of the groove part at the front side of the upper right of the horizontal optical mouse base 211 on which the horizontal guide cylinder 202b is assembled, and the left side of the horizontal tension spring 203b is coupled to the tension spring end cap 204.

Another horizontal tension spring 203b is also assembled on the left end of the horizontal guide cylinder 202b in the upper portion of the lower side of the horizontal optical mouse base 211, so the left side of the horizontal tension spring 203b is coupled to the perimeter of the groove part at the rear side of the upper left of the horizontal optical mouse base 211 on which the horizontal guide cylinder 202b is assembled, and the right side of the horizontal tension spring 203b is coupled to each of the tension spring end caps 204.

The tension spring end caps 204 moves along two horizontal guide cylinders 202b disposed at top and bottom while the upper portions of each of the tension spring end caps 204 are coupled to one end of the horizontal tension spring 203b and the lower portions are in contact with horizontal guide cylinders 202b vertically coupled at both ends of the horizontal optical mouse base 211.

As illustrated in FIG. 3, when the optical mouse pointing module 220 is disposed eccentrically on the right side of the horizontal optical mouse base 211, a lower tension spring end cap 204 contacting a lower right side of a member on which horizontal holes for being assembled with the horizontal guide cylinder 202b at both ends of the optical mouse pointing module 220 in the vertical direction are formed is disposed at a right portion of the lower horizontal guide cylinder 202b and a length of the coupled lower horizontal tension spring 203b also extends, and the upper tension spring end cap 204 is in contact with an end disposed inside a horizontal guide cylinder cover 205b and is not in contact with a left surface of the member on which the horizontal holes for being assembled with the upper horizontal guide cylinder 202b of the optical mouse pointing module 220 are formed.

In FIG. 3, when a thumb operating the optical mouse pointing module 220 is separated from the optical mouse pointing module 220, a restoring force of the lower horizontal tension spring 203b acts to cause the lower tension spring end cap 204 coupled to the lower horizontal tension spring 203b to apply force to a surface of the member on which the horizontal holes for being assembled with the vertical guide cylinder 202a at the lower right of the optical mouse pointing module 220 are formed to move the optical mouse pointing module 220 to the left, and then the lower tension spring end cap 204 is in contact with and stops at an end formed inside the lower horizontal guide cylinder cover 205b to return the optical mouse pointing device 210 to a center of the horizontal optical mouse pointing device 210.

FIG. 3 illustrates the appearance in which the optical mouse pointing module 220 moves to the right side, and the returning structure as described above is described. Even when the optical mouse pointing module 220 moves to the left, the returning structure is the same, with only the horizontal tension spring 203b acting as an elastic restoring force being different.

In the horizontal guide cylinder cover 205b, the end is formed inside the corresponding position so that the tension spring end cap 204 and the horizontal optical mouse pointing device 210 may stop when the horizontal optical mouse pointing module 220, which returns in contact with the tension spring end cap 204, returns to the center of the optical mouse pointing device 211, a slot hole is formed so that the tension spring end cap 204 does not interfere when moving in one direction in which the tension force of the horizontal tension spring 203b acts, so one pad on the upper portion and one pad on the lower portion are coupled around the upper groove parts at both ends of the horizontal optical mouse base 211 in the horizontal direction, as illustrated in FIG. 3.

Figure 4:
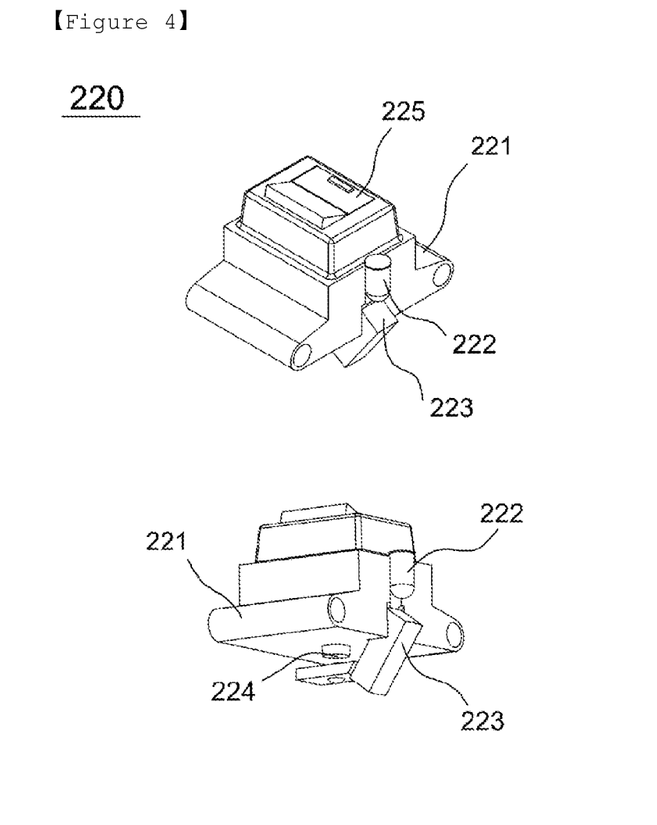
FIG. 4 is a configuration diagram of an "optical mouse pointing module" illustrated in FIG. 3.

FIG. 4 is a configuration diagram of the "optical mouse pointing module" illustrated in FIG. 3.

The optical mouse pointing module 220 includes an LED lamp 222, an optical lens 223, and a light receiving unit 224, just like a typical optical mouse pointing device, and the horizontal holes are formed in members at both ends of the optical mouse pointing body 221 in the vertical direction so that the optical mouse pointing body 221 may move in the horizontal direction along the horizontal guide cylinder 202b, and a momentary push button 225 is further included at the upper portion of the optical mouse pointing body 221. The momentary push button 225 may be configured in one stage or two or more stages, and controls a mouse pointer to move on a computer monitor screen only when pressed.

Figure 5:
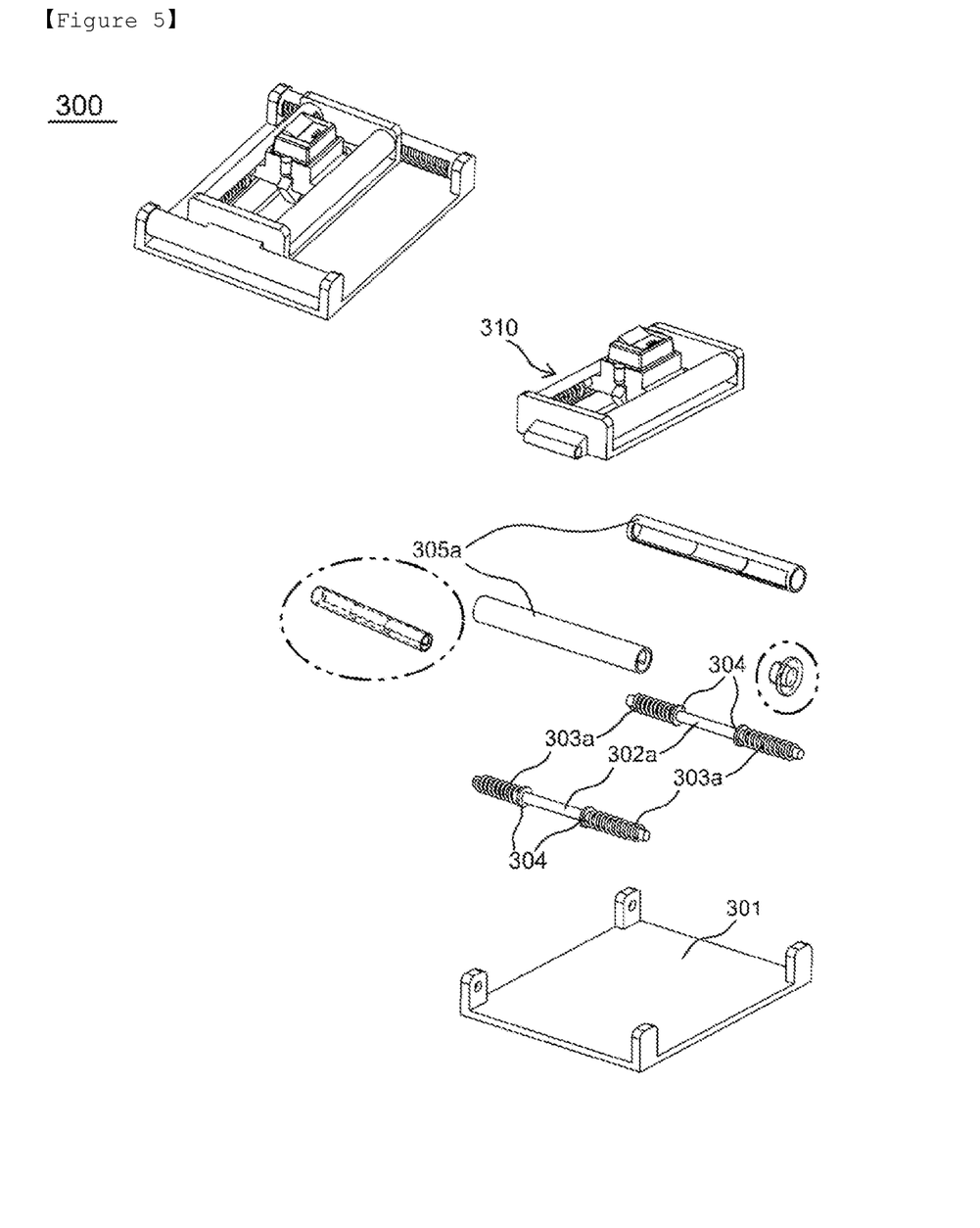
FIG. 5 is a configuration diagram of an "optical mouse pointing device" according to another embodiment of the present invention.

FIG. 5 is a configuration diagram of the "optical mouse pointing device" according to another embodiment of the present invention.

One vertical guide cylinders 302a on the left and right, respectively, is coupled to one groove part disposed at both ends of an optical mouse pad base 301 in a vertical direction whose bottom surface functions as an optical mouse pad.

Two vertical compression springs 303a are each assembled to upper and lower ends of the left vertical guide cylinder 302a, respectively, one side of the vertical compression spring 303a is coupled to the perimeter of the groove part on the left side of the optical mouse pad base 301 on which the vertical guide cylinder 302a is assembled, and the other side of the vertical compression spring 303a is coupled to a compression spring end cap 304. The vertical compression spring 303a and the compression spring end cap 304 are coupled to the right vertical guide cylinder 302a in the same manner as above.

The compression spring end cap 304 moves along the vertical guide cylinder 302a while being in contact with the vertical guide cylinder 302a coupled in the vertical direction at both ends of the optical mouse pad base 301.

As illustrated in FIG. 5, when the horizontal optical mouse pointing device 310 is disposed eccentrically above the optical mouse pad base 301, two compression spring end caps 304 contacting a front surface of a member on which vertical holes for being assembled with the vertical guide cylinder 302a at both ends of the horizontal optical mouse pointing device 310 in a horizontal direction are formed is disposed in front of the vertical guide cylinder 302a and lengths of the coupled front two vertical compression springs 303a are also reduced, and the lower compression spring end cap 304 is in contact with an end disposed inside a vertical guide cylinder cover 305a and is not in contact with a rear surface of the member on which the vertical holes for being assembled with the vertical guide cylinder 302a at both ends of the horizontal optical mouse pointing device 310 in a horizontal direction are formed.

In FIG. 5, when the thumb operating the optical mouse pointing module 220 is separated from the optical mouse pointing module 220, a restoring force of the upper vertical compression spring 303a acts to cause the upper compression spring end cap 304 coupled to the upper vertical compression spring 303a to apply force to a front surface of the member on which the vertical holes for being assembled with the vertical guide cylinder 302a at both ends of the horizontal optical mouse pointing device 310 in a horizontal direction are formed to move the horizontal optical mouse pointing device 310 downward, and then the upper compression spring end cap 304 is in contact with and stops at an upper end formed inside the vertical guide cylinder cover 305a to return the horizontal optical mouse pointing device 310 to the center of the optical mouse pointing device 300.

FIG. 5 illustrates the appearance in which the horizontal optical mouse pointing device 310 moves upward, and the returning structure as described above is described. Even when the horizontal optical mouse pointing device 310 moves downward, the returning structure is the same, with only the vertical compression spring 303a acting as an elastic restoring force being different.

In the vertical guide cylinder cover 305a, the end is formed inside the corresponding position so that the compression spring end cap 304 and the horizontal optical mouse pointing device 310 may stop when the horizontal optical mouse pointing device 310, which returns in contact with the compression spring end cap 304, returns to the center of the optical mouse pointing device 300, and the slot hole is formed so that the compression spring end cap 304 does not interfere when moving in one direction in which the tension force of the vertical compression spring 303a acts, so one pad on the left and one pad on the right are coupled around the groove parts at both ends of the optical mouse pad base 301 in the vertical direction, as illustrated in FIG. 5.

Figure 6:
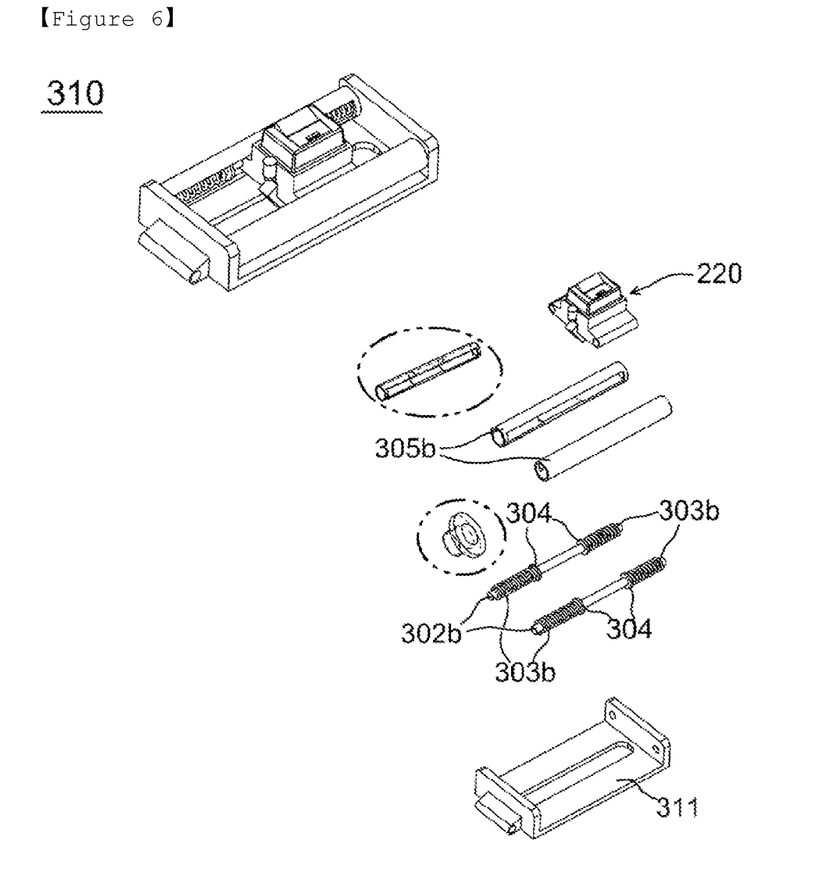
FIG. 6 is a configuration diagram of a "horizontal optical mouse pointing device" illustrated in FIG. 5.

FIG. 6 is a configuration diagram of the "horizontal optical mouse pointing device" illustrated in FIG. 5.

In the horizontal optical mouse base 311, the central portion of the bottom is perforated long in the horizontal direction so that light generated from the LED lamp 222 of the optical mouse pointing module 220 and transmitted to the optical lens 223 may pass through, the vertical holes are formed in members at both ends of the horizontal optical mouse base 311 in the vertical direction so that it may move in the vertical direction along the vertical guide cylinder 302a, and one groove part is disposed at the top and bottom inside both ends of the horizontal optical mouse base 311 in the horizontal direction. One horizontal guide cylinder 302b is coupled to the upper and lower groove parts of the horizontal optical mouse base 311, respectively.

Two horizontal compression springs 303b are assembled at both ends of the horizontal guide cylinder 302b above the horizontal optical mouse base 311, so one end of the horizontal compression spring 303b is coupled to a perimeter of the upper groove part of the horizontal optical mouse base 311 on which the horizontal guide cylinder 302b is assembled and the other side of the horizontal compression spring 303b is coupled to the compression spring end cap 304. The horizontal compression spring 303b and the compression spring end cap 304 are also coupled to the lower horizontal guide cylinder 302b in the same manner as above.

The compression spring end cap 304 moves along the horizontal guide cylinder 302b while being coupled to one end of the horizontal compression spring 303b, and being in contact with the horizontal guide cylinder 302b horizontally coupled at both ends of the horizontal optical mouse base 311.

As illustrated in FIG. 6, when the optical mouse pointing module 220 is disposed eccentrically on the right side of the horizontal optical mouse base 311, a lower tension spring end cap 302 contacting a lower right side of a member on which horizontal holes for being assembled with the horizontal guide cylinder 202b at both ends of the optical mouse pointing module 220 in the vertical direction are formed is disposed at a right portion of the lower horizontal guide cylinder 202b and a length of the coupled lower horizontal tension spring 203b also extends, and the left compression spring end cap 304 is in contact with an end disposed inside the horizontal guide cylinder cover 205b and is not in contact with a left surface of the member on which the horizontal holes for being assembled with the horizontal guide cylinders 302b at both ends of the optical mouse pointing module 220 in the vertical direction are formed.

In FIG. 6, when the thumb operating the optical mouse pointing module 220 is separated from the optical mouse pointing module 220, the restoring force of the right horizontal compression spring 303b acts to cause the right compression spring end cap 304 coupled to the right horizontal compression spring 303b to apply force to a surface of the member on which the horizontal holes for being assembled with the horizontal guide cylinder 302b at the lower right of the optical mouse pointing module 220 are formed to move the optical mouse pointing module 220 to the left, and then the right compression spring end cap 304 is in contact with and stops at a right end formed inside the horizontal guide cylinder cover 305b to return the optical mouse pointing module 220 to the center of the horizontal optical mouse pointing device 310.

FIG. 6 illustrates the appearance in which the optical mouse pointing module 220 moves to the right side, and the returning structure as described above is described. Even when the optical mouse pointing module 220 moves to the left, the returning structure is the same, with only the horizontal compression spring 303b acting as the elastic restoring force being different.

In the horizontal guide cylinder cover 305b, the end is formed inside the corresponding position so that the compression spring end cap 304 and the horizontal optical mouse pointing device 310 may stop when the optical mouse pointing device 220, which returns in contact with the compression spring end cap 304, returns to the center of the horizontal optical mouse pointing device 310, the slot hole is formed so that the compression spring end cap 304 does not interfere when moving in one direction in which the compression force of the horizontal compression spring 303b acts, so one pad on the upper portion and one pad on the lower portion are coupled around the upper groove parts at both ends of the horizontal optical mouse pad base 311 in the horizontal direction, as illustrated in FIG. 6.

The invention claimed is:

1. A computer keyboard provided with a thumb-operated optical mouse, comprising:
a computer keyboard;
an optical mouse pointing device comprising an optical mouse pointing module that is operated with a thumb of one hand and is in charge of moving a mouse pointer, and an optical mouse pad base that guides the optical mouse pointing module horizontally and vertically and functions as an optical mouse pad; and
an optical mouse click button,
wherein the optical mouse pointing module comprises an LED lamp, an optical lens, and a light receiving unit formed in an optical mouse pointing body, and as a position of the optical mouse pointing module moves by the thumb, a position of the optical mouse pointer is controlled, and
wherein the optical mouse pointing module further comprises a momentary push button, and the optical mouse pointer moves on a monitor according to a positional displacement of the optical mouse pointing module only when the momentary push button is pressed, when the momentary push button is not pressed, the position of the pointer is controlled not to move on the monitor even if there is a positional displacement of the optical mouse pointing module, when the optical mouse pointing module moves while pressing the momentary push button with the thumb to move the optical mouse pointer, the optical mouse pointing module moves in an opposite direction to previous movement or toward a center of the optical mouse pad base while not pressing the momentary push button, and then the optical mouse pointing module moves while pressing the momentary push button with the thumb, the mouse pointer is controlled to further move from an immediately previous position, and even if the optical mouse pointing module moves within a limited size of the pad base of the optical mouse pointing device, the position of the mouse pointer is easily controlled with a mouse resolution set by a user.

2. The computer keyboard of claim 1, wherein the momentary push button of the optical mouse pointing module is configured in two or more stages, and when the mouse resolution is set differently for each stage and press and move a designated stage of the momentary push button with the thumb, by moving the mouse pointer to the mouse resolution of the corresponding stage, even if the optical mouse pointing module moves within the limited size of the pad base of the optical mouse pointing device, the position of the mouse pointer is easily controlled.

3. The computer keyboard of claim 1, wherein the optical mouse pointing device comprises: a one side optical mouse pointing device composed of a plurality of guide members coupled at both ends to a body of the optical mouse pointing module to guide the movement of the optical mouse pointing module in one direction, a one side optical mouse base having the guide member coupled thereto and having a central portion of a bottom perforated long in one direction so that light generated from an LED lamp of the optical mouse pointing module and transmitted to an optical lens passes through, and a the optical mouse pointing module; a plurality of guide members coupled to both ends of the one side optical mouse base of one side optical mouse pointing device in order to guide the one side optical mouse pointing device in a direction perpendicular to a movement direction of one side of the optical mouse pointing module of the one side optical mouse pointing device; and an optical mouse pad base coupled to the guide member and having an upper surface of a bottom serving as an optical mouse pad.

4. The computer keyboard of claim 3, wherein in the one side optical mouse pointing device, when the thumb that operates the optical mouse pointing module is separated from the optical mouse pointing module, an elastic member for returning the optical mouse pointing module to the center of the one side optical mouse pointing device is disposed at an end of the guide member, one side of the elastic member is coupled to the one side optical mouse base, and the other side of the elastic member is coupled to an elastic member end cap, a slot hole is formed in a guide direction on one side of the guide member cover surrounding the guide member to prevent interference with the movement of the elastic member end cap, a step is formed inside the central portion so that the elastic member end cap to which the elastic member is coupled is in contact with and stops at the step, so the optical mouse pointing module that moves in contact with one or more elastic member end caps is fixed at the center of the one side optical mouse base.

5. The computer keyboard of claim 3, wherein in the optical mouse pointing device, when the thumb that operates the optical mouse pointing module is separated from the optical mouse pointing module, an elastic member for returning the one side optical mouse pointing device to the center of the optical mouse pointing device is disposed at an end of the guide member, one side of the elastic member is coupled to the optical mouse pad base, and the other side of the elastic member is coupled to an elastic member end cap, a slot hole is formed in a guide direction on one side of the guide member cover surrounding the guide member to prevent interference with the movement of the elastic member end cap, a step is formed inside the central portion so that the elastic member end cap to which the elastic member is coupled is in contact with and stops at the step, so the one side optical mouse pointing device that moves in contact with one or more elastic member end caps is fixed at the center of the optical mouse pad base.

6. The computer keyboard of claim 1, wherein in the optical mouse pointing device, a protective cover made of a flexible material is covered between a border area adjacent to the keyboard into which the device is inserted and a perimeter of the body of the optical mouse pointing module to prevent foreign substances such as beverages and dust from penetrating and interference with the movement of the optical mouse pointing module.

7. A computer keyboard provided with a thumb-operated optical mouse, comprising:
a computer keyboard;
an optical mouse pointing device comprising an optical mouse pointing module that is operated with a thumb of one hand and is in charge of moving a mouse pointer, and an optical mouse pad base that guides the optical mouse pointing module horizontally and vertically and functions as an optical mouse pad; and
an optical mouse click button,
wherein the optical mouse pointing device is disposed on one side below a space bar of the keyboard to easily operate the optical mouse pointing module with the thumb of the same hand while maintaining a index finger of one hand at a reference position of the keyboard; the optical mouse click button is placed on an opposite side of the optical mouse pointing device below the space bar of the keyboard so that left-click button, right-click button, and wheel button of the mouse are operated with a thumb of another hand other than one hand that operates the optical mouse pointing module while maintaining the thumb of the hand other than the hand that operates the optical mouse pointing module at the reference position of the keyboard; and by separately performing the pointer movement of the optical mouse and the clicking operation of the button with the thumbs of both hands and maintaining the thumbs of both hands at each reference position on the keyboard, when using the computer to input character keys and perform a mouse operation, the movement of both hands is minimized, maximizing operation efficiency and maintaining user's concentration.

8. A computer keyboard provided with a thumb-operated optical mouse, comprising:

a computer keyboard;

an optical mouse pointing device comprising an optical mouse pointing module that is operated with a thumb of one hand and is in charge of moving a mouse pointer, and an optical mouse pad base that guides the optical mouse pointing module horizontally and vertically and functions as an optical mouse pad; and an optical mouse click button, wherein the optical mouse pointing device is disposed on one side below the space bar of the keyboard to facilitate the operation of the optical mouse pointing module with the thumb of the same hand while maintaining the index finger of one hand at the reference position of the keyboard; and allows the optical mouse click button to operate the left click button, right click button, and wheel button of the mouse with the same hand that operates the optical mouse pointing module and click the left-click button, wheel button, and right-click button of the mouse by pressing each character key with the index finger, middle finger, and ring finger of the same hand while pressing and holding the momentary push button with the thumb to notify the computer that the mouse pointer is in the movement mode, and perform up and down scrolling functions of the wheel button by arranging dedicated control keys separated from the character key above and below the character key handled, in particular, by the middle finger, respectively; thereby performing all functions of the optical mouse with only one hand.

\* \* \* \* \*